June 12, 1923.
C. R. LOTT
1,458,834
APPARATUS FOR PRODUCING CHARGES OF MOLTEN GLASS
Original Filed Sept. 27, 1909
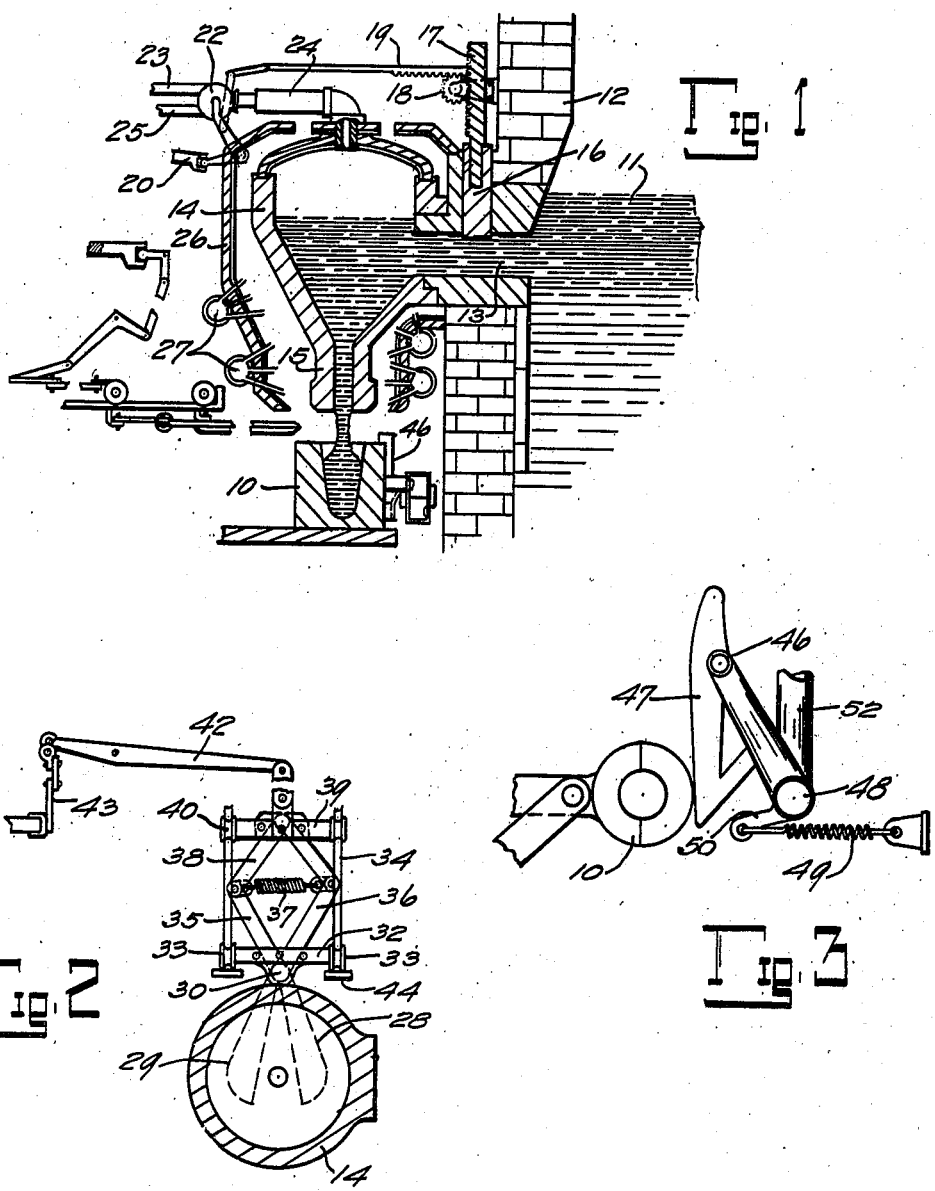
INVENTOR
CLYDE R. LOTT
BY J.F. Rule
HIS ATTORNEY Patented June 12, 1923.

1,458,834

UNITED STATES PATENT OFFICE.

CLYDE R. LOTT, OF WASHINGTON, DISTRICT OF COLUMBIA, ASSIGNOR, BY MESNE ASSIGNMENTS, TO THE OWENS BOTTLE COMPANY, A CORPORATION OF OHIO.

APPARATUS FOR PRODUCING CHARGES OF MOLTEN GLASS.

Original application filed September 27, 1909, Serial No. 519,678. Divided and application filed July 13, 1918, Serial No. 244,684. Divided and this application filed January 7, 1922. Serial No. 527,650.

*To all whom it may concern:*

Be it known that I, CLYDE R. LOTT, a citizen of the United States, residing at Washington, in the District of Columbia, have invented new and useful Improvements in Apparatus for Producing Charges of Molten Glass, of which the following is a specification.

My invention relates to apparatus for making glass ware by the method which consists in discharging the glass from an outlet in the furnace or receptacle containing molten glass, and intermittently severing the discharging glass by a mechanical shear or cutter, thereby segregating individual masses or gobs which are introduced into molds of a glass forming machine.

An object of my invention is to provide improved means for reheating the cut surface of the glass remaining after each gob has been severed, thereby eliminating the shear marks and putting the glass in the best condition for being formed in the mold. The glass as it is discharged from the furnace, boot or supply chamber is in a semi-liquid or plastic condition and at a very high temperature. The contact of the metal cutter or shears, which must be kept at a comparatively low temperature to prevent sticking to the glass, chills the surface of the glass. If the glass is placed in the mold in this condition the chilled surface does not readily take the form of the mold. The chilling of the glass also changes its density, refractive power and homogeneity, so that there results a scar or defect in the finished ware. In the present invention this defect is overcome by providing a burner which is brought beneath the cut surface of glass after each cutting operation and directs a flame upwardly against said surface, thereby re-melting the chilled surface and eliminating the scar.

Other features of the invention will appear hereinafter.

The present application is a division of my co-pending application relating to improvements in making glass ware, Serial Number 244,684, filed July 13, 1918. In said co-pending application I have claims to the method which comprises the reheating of the remaining stub of glass after each charge has been severed, and I do not claim such method in the present application. This application is directed particularly to the apparatus herein shown for practicing such method.

In the accompanying drawings:

Figure 1 is a sectional elevation showing a furnace, a mold, cutting apparatus, and appurtenances.

Figure 2 is a plan view of the cutting apparatus.

Figure 3 is a plan view of the burner for reheating the glass after it is cut.

The molds 10 which receive the charges of glass are brought successively beneath the glass discharging opening of the furnace. The molds may be carried on and form part of a glass shaping machine on which the glass is pressed and blown or otherwise manipulated in the molds to form bottles or other ware. Any suitable or approved type of glass forming machine, or apparatus for bringing the molds successively to charging position, may be employed.

The molten glass 11 is supplied from a continuous melting furnace 12. The glass flows from the melting tank through a passageway 13 into a supply chamber 14. The latter is formed with a neck or spout 15 providing a restricted passageway through which the molten glass flows or is discharged downwardly into the mold 10 therebeneath. The flow of glass from the chamber 14 may be controlled by intermittently varying the air pressure within the chamber. A gate valve 16 may be used to close the outlet 13 and permit such pressure control. The gate is actuated by a rack 17 connected thereto and driven by a pinion 18, the latter being driven by a rack 19 through suitable connections. The rack 19 is driven through intermediate connections from an actuating lever 20.

The air pressure in the chamber 14 is controlled by a three-way valve 22. When the valve is in one position, air pressure is admitted from a pipe 23 through the valve and a pipe 24 to the chamber 14, thereby assisting gravity to force the glass through the spout 15. When the valve is reversed the air is exhausted through a pipe 25, thereby retarding or stopping the downward movement of the glass through the discharge spout. The valve may be actuated by the lever 20 which, as above noted, also actuates the gate valve 16. The lever 20 may form a part of the glass forming machine comprising the molds 10, as set forth in my copending application Serial Number 244,684, above mentioned.

The supply chamber 14 is enclosed or surrounded by a heating chamber or casing 26 which may be heated by pipes 27. These pipes are arranged to direct heating flames against the neck or spout 15. The arrangement of the pipes and the casing 26 with its lower walls inclined downwardly is such that the flames are caused to envelop the spout 15 and the glass directly beneath the spout as it issues therefrom, whereby the glass issuing from the supply chamber is heated to a sufficient degree, so that the glass is in the best condition for entering the mold and being shaped therein.

The cutting mechanism comprises a pair of shear blades 28 and 29 pivoted at 30 to a transverse bar or axle 32 having wheels 33 which run on tracks 34. The blade 29 has a shank 35 and the blade 28 a shank 36 extending back from the pivot 30. A spring 37 connecting said shanks, normally holds the blades separated. Links 38 connect said shanks to a bar 39 having wheels 40 running on the rails 34. The shears may be actuated by means of a lever 42 connected to the axle 39 and having operating connections 43 with the glass forming machine. The shears are normally withdrawn bodily to a position beyond the heating chamber. When the lever 42 is actuated to bring the shears into operation, the shears are first moved forward with the carriage, comprising the bars 32 and 39, until the front wheels 33 strike stops 44. The continued movement of the lever 42 causes the rear axle 39 to approach the front axle, so that the links 38 spread the shanks 35 and 36 and cause a cutting stroke of the shear blades. These movements are then reversed to separate the shear blades and withdraw the shears from beneath the spout.

The gate valve 16, the three-way valve 22 and the shears are all operated in suitable timed relation to effect their functions in their proper order. That is to say, the gate valve is closed while pressure is applied through the three-way valve, thereby preventing the glass from being forced back into the furnace and permitting suitable pressure to be maintained for discharging the glass at the spout 15. After such pressure has been maintained a sufficient length of time the three-way valve is reversed, thereby reducing the pressure in the supply chamber below atmospheric pressure. This causes a reduction in the flow and causes the stream or column of glass at the cut-off point to be restricted. The shears then operate to sever the charge or gather of glass. By the term "charge" or "gather" is meant the quantity or mass of glass which is supplied to a mold during a mold charging operation. The mold is then withdrawn and replaced by a succeeding mold.

Figure 3 shows a means for reheating the cut end of the stream or column of glass after the shears operate. This means comprises a jointed burner 46 which throws a blaze upward against the cut end of the glass during the time the mold 10 is removed from its charging position beneath the spout. When the mold is extended to the position shown in Figures 1 and 3 to receive a charge, it strikes a finder 47 attached to the burner which is jointed at 48, and moves the burner away from the spout. As soon as the mold is moved away from the spout, the burner is swung to its operative position by a spring 49. The spring is connected to a support at one end and is attached at its other end to an arm 50 rigidly connected with the burner. Fuel is supplied to the burner by a pipe 52. The construction just described provides means whereby a flame is directed against the cut end of the glass after the gob is severed, thereby reheating the surface which has been chilled by contact with the comparatively cold cutter. The knife scar which would otherwise appear in the finished ware is thus entirely eliminated and the glass placed in the best condition for being formed in the mold. It will be understood, of course, that the shears are withdrawn after each cut so as not to interfere with the flame being thrown directly against the end of the cut surface of the glass.

Modifications may be resorted to without departing from the spirit and scope of my invention.

What I claim is:

1. The combination with a receptacle to contain molten glass and having a discharge opening in the bottom thereof through which the glass discharges downwardly, a mechanical cutter, means to periodically operate the cutter to sever charges of glass at a point a short distance below the discharge opening and then withdraw the cutter, a burner located at one side of the path of the glass, and means to shift the burner beneath the discharge opening after the cutter withdraws and direct a flame against the freshly cut surface of the glass.

2. The combination with a receptacle to contain molten glass provided with an opening in the bottom thereof from which the glass is discharged, a cutter operable to sever individual masses from said stream at a point below the discharge opening, a burner, means to move the burner to a position beneath the cut end of glass after the cutter has operated, and direct a flame against said cut end, and means to withdraw the burner in advance of the next cutting operation.

3. The combination with a receptacle to contain molten glass and having an orifice through which the glass is discharged, a cutter independent of the receptacle and spaced from the walls thereof, means for intermittently operating the cutter to sever the glass near the orifice and then withdraw the cutter, means to heat the cut end of glass, said heating means being withdrawn during the cutting operation, and means to move the heating means into operative position after the withdrawal of the cutter.

4. The combination with a receptacle to contain molten glass and having an orifice through which the glass is discharged, a cutter, means for intermittently operating the cutter to sever the glass near the orifice and then withdraw the cutter, and a burner movable intermittently in timed relation to the cutter into and out of operative position and operable to direct a flame against the cut end of glass after each withdrawal of the cutter.

5. The combination with means for flowing a stream of molten glass, of oppositely movable cutter blades for severing charges of glass from said stream, a heating device wholly independent of said severing means, and means to move said heating device into position to reheat the end of the stream from which a charge has been severed, and to then withdraw said device.

6. The combination with means for flowing a stream of molten glass, of means for severing charges of glass from said stream, a heating device supplying a flame of burning gas, and means to move said heating device into position to cause said flame to reheat the end of the stream from which the charge has been severed, and to then withdraw said device.

7. The combination with means for flowing a stream of molten glass, of means for severing charges of glass from said stream, a heating device, said severing means being separate from and to one side of the heating device and movable independently thereof, and means to move said heating device after a severing operation is completed, into position to reheat the end of the stream from which a charge has been severed, and to then withdraw said device.

8. The combination with a container for molten glass having an outlet opening from which the glass flows in a stream, of means independent of the container and spaced from the walls thereof for severing charges of glass from said stream at a point below and spaced from said opening, a heating device, and means to move said heating device into position to reheat the end of the stream from which a charge has been severed, and to then withdraw said device.

9. The combination with means for delivering a downwardly flowing suspended stream of glass, of opposed metallic blades severing charges of glass from said stream at a point spaced below the suspension plane, a heating device, the blades being movable independently of the heating device, and means to move said heating device into position to reheat the end of the stream from which a charge has been severed, and to then withdraw said device.

10. The combination of a container for molten glass, having a discharge opening in the floor thereof, through which the glass is discharged vertically downward, means independent of the container and spaced vertically below the wall surrounding said discharge opening to periodically sever the issuing glass at a point spaced below the outlet, and reheating means automatically brought into operative position beneath said opening after each severing operation to reheat the remaining stub.

11. The combination of a container for molten glass, having a discharge opening in the floor thereof, through which the glass is discharged vertically downward, horizontally movable severing means arranged below said outlet and movable to periodically sever the issuing glass, reheating means including a nozzle, means for moving said severing means out of operative position with respect to the issuing glass after the severing operation, and for moving said nozzle into operative position beneath the opening after each severing operation to reheat the remaining stub.

12. The combination of a container for molten glass, having a discharge opening in the floor thereof, through which the glass is discharged vertically downward, means to periodically sever the issuing glass at a point below the outlet, including horizontally movable metallic cutters out of contact with the walls of the furnace and having cutting edges arranged to approach the glass from different directions and to recede from the glass after the severing operation, and a heating device out of contact with said cutters adapted to be moved into a position vertically spaced below said outlet after the completion of the severing operation to act upon the remaining glass.

13. The combination with a receptacle to contain molten glass and having an orifice through which the glass is discharged vertically downward, horizontally movable cutting means spaced vertically beneath the outlet, means for intermittently operating the cutting means to sever the glass and then withdraw said means, and a movably mounted heating element operating intermittently in timed relation to the operations of the cutter to direct a stream of hot gas against the cut end of the glass after each withdrawal of the cutting means.

Signed at Washington, in the District of Columbia, this 6th day of January, 1922.

CLYDE R. LOTT.